United States Patent
Cano Sordo

(10) Patent No.: US 12,059,014 B2
(45) Date of Patent: Aug. 13, 2024

(54) PROCESS FOR THE MANUFACTURE OF EDIBLE FUNGI OR MUSHROOMS IN SAUCE

(71) Applicant: GRUPO MONTEBLANCO MB S.A. DE C.V., Mexico City (MX)

(72) Inventor: Alfonso José Cano Sordo, Mexico City (MX)

(73) Assignee: GRUPO MONTEBLANCO MB S.A. DE C.V., Mexico City (MX)

(*) Notice: Subject to any disclaimer, the term of this patent is extended or adjusted under 35 U.S.C. 154(b) by 250 days.

(21) Appl. No.: 17/644,389

(22) Filed: Dec. 15, 2021

(65) Prior Publication Data
US 2022/0400725 A1 Dec. 22, 2022

(30) Foreign Application Priority Data
Jun. 17, 2021 (MX) .................. MX/a/2021/007295

(51) Int. Cl.
*A23L 31/00* (2016.01)
*A23B 7/06* (2006.01)
(Continued)

(52) U.S. Cl.
CPC ............... *A23L 31/00* (2016.08); *A23B 7/06* (2013.01); *A23L 5/13* (2016.08); *A23L 19/09* (2016.08); *A23L 23/00* (2016.08); *A23V 2002/00* (2013.01)

(58) Field of Classification Search
CPC .......... A23L 31/00; A23L 19/09; A23L 23/00; A23L 3/10; A23L 3/16–3/245; A23L 5/13; A23L 23/10; A23B 7/06
See application file for complete search history.

(56) References Cited

U.S. PATENT DOCUMENTS 2,396,924 A * 3/1946 Monath ................. A47J 36/165
  99/348
2,456,981 A * 12/1948 Monath ................. A47J 36/165
  126/369
(Continued)

FOREIGN PATENT DOCUMENTS

CN 101803722 B 8/2010
CN 101933607 A 1/2011
(Continued)

OTHER PUBLICATIONS

Spicy Garlic Mushroom NPL, https://www.cookwithkushi.com/spicy-garlic-mushroom/ (Year: 2017).*

*Primary Examiner* — Drew E Becker
(74) *Attorney, Agent, or Firm* — Heslin Rothenberg Farley Mesiti, P.C.

(57) ABSTRACT

The present invention relates to a process for manufacturing edible mushrooms in sauce, which comprises: a) starting with previously processed fresh raw material, blanching said raw material in water; b) milling the raw material to obtain a homogenate; c) pouring edible vegetable oil into a steam-heated pressure vessel and raising the temperature of the vegetable oil; d) adding the homogenate to the container with heated vegetable oil and stirring the homogenate/oil mixture; e) adding powdered ingredients to the previous mixture; f) adding sliced edible mushroom to the mixture from the previous step until the mixture boils; g) once said boiling temperature has been reached, shutting off the steam supply to the steam-heated pressure vessel.

17 Claims, 1 Drawing Sheet

(51) Int. Cl.
 *A23L 5/10* (2016.01)
 *A23L 19/00* (2016.01)
 *A23L 23/00* (2016.01)

(56) References Cited

U.S. PATENT DOCUMENTS

| | | | | | |
|---|---|---|---|---|---|
| 3,112,917 | A | * | 12/1963 | Woerner | A47J 36/165 |
| | | | | | 366/250 |
| 3,334,575 | A | * | 8/1967 | Erwin | A21B 5/00 |
| | | | | | 416/177 |
| 3,681,090 | A | * | 8/1972 | Huth | A23L 2/08 |
| | | | | | 426/655 |
| 4,407,832 | A | * | 10/1983 | Ferguson | A23L 3/0155 |
| | | | | | 426/321 |
| 4,547,383 | A | * | 10/1985 | Goldhahn | A23L 5/13 |
| | | | | | 426/511 |
| 4,597,974 | A | * | 7/1986 | Fonteneau | A23L 13/06 |
| | | | | | 426/643 |
| 4,680,188 | A | * | 7/1987 | Agulhon | A23B 7/158 |
| | | | | | 426/324 |
| 5,397,584 | A | * | 3/1995 | Aung | A23L 27/14 |
| | | | | | 426/321 |
| 5,436,022 | A | * | 7/1995 | Chiang | A23L 19/09 |
| | | | | | 426/50 |
| 5,965,190 | A | * | 10/1999 | Gallaher | A23L 19/09 |
| | | | | | 426/520 |
| 6,004,601 | A | * | 12/1999 | Donato | A23B 7/157 |
| | | | | | 426/321 |
| 2001/0053402 | A1 | * | 12/2001 | Orii | A23L 23/00 |
| | | | | | 426/399 |
| 2004/0065211 | A1 | * | 4/2004 | McNair | A47J 27/10 |
| | | | | | 99/348 |
| 2007/0054010 | A1 | * | 3/2007 | Kalum | C12Y 302/01015 |
| | | | | | 426/51 |
| 2010/0047429 | A1 | * | 2/2010 | Bell | A23L 5/11 |
| | | | | | 426/524 |
| 2013/0064942 | A1 | * | 3/2013 | Benjamin | A23B 7/00 |
| | | | | | 426/616 |
| 2016/0073672 | A1 | * | 3/2016 | Dalla Rosa | A23L 31/00 |
| | | | | | 426/589 |
| 2016/0353933 | A1 | * | 12/2016 | Cloutier | A47J 43/044 |
| 2018/0027859 | A1 | * | 2/2018 | Brugnara | A23L 11/30 |
| 2020/0305479 | A1 | * | 10/2020 | Weigensberg | A23L 27/70 |
| 2023/0284666 | A1 | * | 9/2023 | Seo | A23L 5/51 |

FOREIGN PATENT DOCUMENTS

| | | |
|---|---|---|
| CN | 102885286 A | 1/2013 |
| CN | 103689548 A | 4/2014 |
| CN | 104824629 A | 8/2015 |
| CN | 104886549 A | 9/2015 |
| CN | 107212362 A | 9/2017 |

* cited by examiner

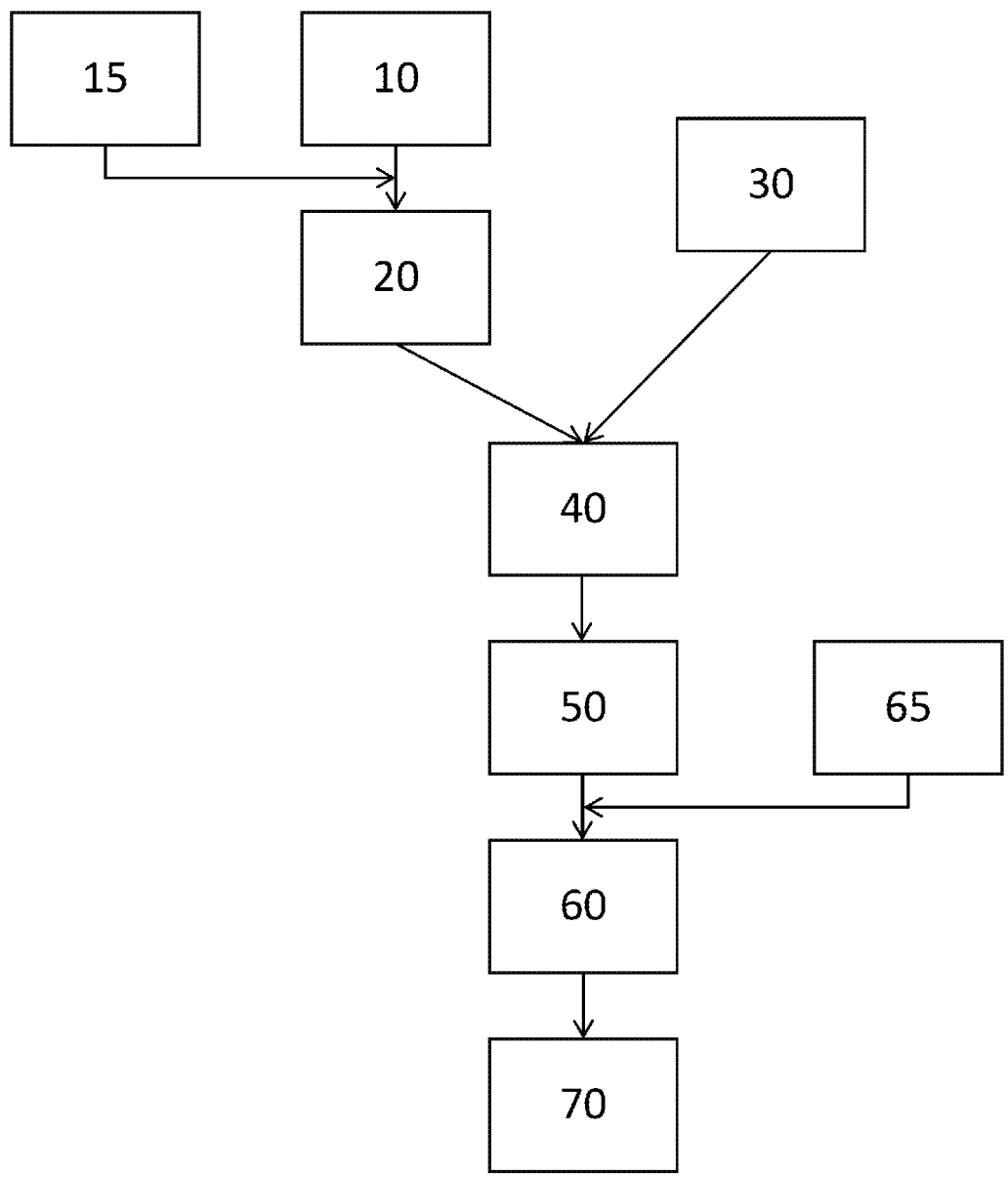

PROCESS FOR THE MANUFACTURE OF EDIBLE FUNGI OR MUSHROOMS IN SAUCE

CROSS REFERENCE TO RELATED APPLICATIONS

This application claims priority under 35 U.S.C. § 119 to Mexican Patent Application No. MX/a/2021/007295 filed on Jun. 17, 2021, in the Mexican Intellectual Property Office, which is incorporated herein by reference in its entirety.

SUBJECT MATTER OF THE INVENTION

The present invention relates to a process for preparing edible fungi or mushrooms in sauce, where the fungus or mushroom present in the sauce has a uniform firm texture, additionally, the fungi or mushrooms present in the sauce absorb said sauce, achieving a balanced mixture of flavors.

BACKGROUND

There are also processes in the state of the art to prepare edible sauces with pieces of mushrooms whose level of absorption of the sauce in which it is immersed is high. The most relevant documents found are described below:

Document CN101933607 relates to a method for producing a spicy mushroom sauce. The method comprises the steps of: (1) pretreating the raw material, which includes washing and chopping ingredients such as onion, ginger, Shiitake mushroom (an Asian mushroom species), pepper, as well as cutting pork into pieces; (2) sautéing the ingredients (garlic, ginger, mushroom, and meat) in oil at 120-140° C. for 5-10 minutes and then adding soy sauce and hot sauce to the sauté; (3) subsequently adding water to the mixture and boiling for 30 minutes; (4) slowly adding modified starch to the mixture and subsequently adding chili while heating and continuously stirring until the sauce is ready and, (5) packaging the product.

Document CN102885286 provides a method for preparing a mushroom sauce, which comprises the steps of (1) preparing the raw material based on herbs, such as citrus, anise, cloves, pepper, tomato paste, cumin, among others; (2) preparing the mushroom, in this case Shiitake mushroom, which is first selected and washed, and then preparing a brine with the mushroom and the raw material of step (1), if necessary, the Shiitake mushroom is diced according to general practice; step (3) comprises preparing the onion, which is peeled, washed and milled; subsequently, in step (4) the carrot is prepared by the same process as the previous step; preparing sesame (5), which includes selecting it and sautéing; in step (6), the sauce is prepared by adding oil to a pan and when it reaches a temperature of 110-120° C., the raw material from step (2) is added; subsequently, when the oil reaches a temperature of 140-150° C., the raw material from steps (3), (4) and (5) is added to the mixture, it is boiled for 20 to 30 minutes and the heat is turned off before adding sweet sauce, soy, bean paste, salt, sugar or monosodium glutamate while stirring the mixture evenly. Finally, the process comprises the steps (7) of packaging and (8) sterilizing the product.

Document CN103689548 focuses on a method for preparing a mushroom sauce based on dried *Lentinula edodes* (Shiitake mushroom) and "black Auricular" fungus or Chinese black fungus, another species of fungus that is very abundant in China. Step (1) of the method comprises cleaning the Shiitake mushroom (removing the pedicle, washing and sterilizing at 120° C. for 50 minutes, draining, cooling to 45° C. and cutting into 0.8 cm cubes); followed by step (2) of cleaning the "black Auricular" fungus by immersion in water at 55° C. for 6 hours, removing the pedicle, washing, submerging in boiling water, cooling and draining. Step (3) consists of preparing spices, which include citrus, star anise, tsaoko, black pepper, green pepper, among others, which are selected and milled and then mixed in a uniform manner; in step (4) the fresh ingredients (pepper) are washed and cut by hand; in step (5) the peanut oil is heated and onion powder, garlic powder, ginger and fresh pepper are added, fried for 23-30 minutes, cooled and filtered; the mixture or "prepared chili" from step (5) is heated again, an amount of peanuts are added and this is fried for 15-20 minutes, then the Shiitake mushroom, spices and this is fried over low heat for 60-90 minutes, followed by the black fungus, in addition to salt, sugar, soy sauce, this is fried for 10-15 more minutes and, finally, white sesame is added and the heating is removed.

Document CN104824629 relates to a process for producing a mushroom sauce. The process begins with the pre-treatment of the sauce ingredients. The mushroom, which is of the Shiitake species, is soaked, cleaned, its stem is removed and finally it is diced, then it is refrigerated to 0-10° C. for several hours, thawed and drained. To prepare the sauce, onion, garlic, and ginger are sautéed in vegetable oil at 100-150° C., then the processed mushrooms are added and the process is continued over low heat at 150-180° C. for 30-50 minutes. Finally, soy sauce, sweet sauce, granulated white sugar, MSG, spices, and dried chili powder are added and mixed evenly.

Document CN104886549 details a method for preparing a mushroom sauce that provides a ready-to-eat solution for Shiitake mushroom. The method comprises pre-processing the Shiitake mushroom, which is selected, cleaned, and placed in a pot, to which an adequate amount of water is added to cook the mushroom for 5-10 minutes. Afterwards, the mushroom is sliced, drained, and fried in hot oil for 5-10 minutes. To process the sauce, alpine peppers are diced and fried in hot oil for 3-5 minutes, followed by the addition of a hot sauce, mixed bean paste and sesame, while continuing to heat. Subsequently, the sauce obtained and the pre-processed mushroom are mixed and fried in hot oil. Monosodium glutamate, salt and other powdered species are added. Finally, the end product is packaged and sterilized for consumption.

Document CN107212362 relates to a method for preparing a sauce based on straw mushroom, which is also a characteristic mushroom from China. The solution provided by this invention focuses on the mass production of straw mushroom sauce. For this, the method comprises (1) washing the mushroom in a washing appliance with high-pressure water, feeding the washed mushroom into a steamer where it will be steamed for 30-35 minutes, a part of the mushroom cooking water will be sent as an ingredient for the sauce as it is rich in nutrients, however not all of it will be used, as it can alter the consistency of the sauce; the cooked mushrooms are cut in multi-purpose vegetable cutters and sent on an automatic conveyor to the frying step where the sauce is prepared (2) by adding the amount of soy sauce, hot sauce, soy oil, red oil, sesame oil, five spice, ginger powder and monosodium glutamate of the formulation, the preparation is carried out with automatic stirring equipment and heating to 80-90° C. for 1-1.5 hours; and, finally, the sauce is taken to the packaging and sterilization step (3), which is also automatic.

Document CN101803722 provides a method for producing a spicy mushroom sauce, particularly from Shiitake mushrooms. The method comprises washing the mushroom prior to preparing the sauce in a washing machine and precooking in two steps that comprises bleaching in water with 1% sodium hyposulfite at a temperature of 70-73° C. for 60 minutes, followed by rapid cooling to less than 25° C. and a second bleaching at 95° C. for 60 minutes in water with 1% citric acid, followed by cooling to less than 25° C. The mushroom is centrifuged, dehydrated and cut to be used in the next operation (preparation of the sauce). To prepare the sauce, a thick sauce of red beans, red pepper, seasonings and water is used, the mixture is heated while stirring until reaching 85° C. or more. Finally, the product is sent to packaging and sterilization. The method is simple and applicable on an industrial scale.

The previous efforts notwithstanding, there is a need to provide edible sauces with fungi or mushrooms whose level of absorption of the sauce in which they are immersed is high, by means of processes that are efficient, simple and cost-effective. Despite the fact that the prior art proposes various solutions, there is no process that combines the sequence of steps disclosed in the present invention, which results in a product with the characteristics described herein.

BRIEF DESCRIPTION OF THE INVENTION

The present invention relates to a process for preparing edible fungi or mushrooms in sauce, which preserves the flavor and texture properties of the fungi or mushrooms, comprising: a) from pre-treated fresh raw material (selected, washed and disinfected), blanching said raw material in water at a temperature of approximately 75 to 92° C. during approximately 18 to 22 minutes; b) milling the blanched raw material together with seasonings and spices at a rotation speed of approximately 3100 to approximately 3700 RPM in order to obtain a homogenate with a particle size of approximately 1 to approximately 6 mm; c) pouring edible vegetable oil into a pressure vessel heated by steam at approximately 1 to approximately 2 $kg/cm^2$ and raising the temperature of the vegetable oil in a range from approximately 100 to approximately 120° C. during approximately 3 to approximately 5 minutes; d) adding the homogenate to the container with heated vegetable oil to obtain a homogenate/oil mixture and stirring the homogenate/oil mixture with a stirring speed of approximately 18 to 23 RPM during approximately 5 to 10 minutes, when adding said homogenate the temperature drops; e) once the homogenate/oil mixture has reached a temperature of approximately 70° C. to 97° C., adding powdered ingredients maintaining the stirring speed of step d), when adding said powdered ingredients the temperature drops to a temperature of 71° C. to 86° C. in order to obtain a homogenate/oil/powdered ingredients mixture; f) once the homogenate/oil/powdered ingredients mixture reaches a temperature of approximately 70 to 97° C., adding sliced edible fungus or mushroom to said mixture, when adding the sliced edible fungus or mushroom the temperature drops, maintaining the stirring speed of approximately 18 to 23 RPM until the mixture boils at a temperature of approximately 90° C. to 93° C.; g) once said boiling temperature has been reached, shutting off the steam supply.

The invention also relates to the edible fungus or mushroom in sauce that is obtained through the process of the invention and which has improved flavor and texture properties of the ingredients, particularly of the fungus or mushroom.

Other aspects, embodiments and advantages are discussed in detail hereunder. The description provides illustrative examples of various aspects and embodiments of the present invention, and an overview or framework is provided for understanding the nature and character of the aspects and embodiments claimed. The accompanying Figures are included to provide further illustration and understanding of the various aspects and embodiments, and are incorporated into and constitute a part of this description. The Figures, together with the description, serve to explain the aspects and embodiments described and claimed.

BRIEF DESCRIPTION OF THE FIGURES

The illustrative embodiment can be described with reference to the accompanying FIGURE, which relates to:

FIG. 1 shows a flow chart of the process for the manufacture of edible fungi or mushrooms in sauce, according to the invention.

DETAILED DESCRIPTION OF THE INVENTION

The following detailed description is exemplary only and is not intended to limit the disclosed embodiments or the application and uses of the described embodiments. As used herein, the word "exemplary" or "illustrative" means "serving as an example, instance, or illustration". Any implementation described herein as "exemplary" or "illustrative" should not necessarily be construed as preferred or advantageous over other implementations. All of the implementations described below are exemplary implementations provided to enable those skilled in the art to make or use the embodiments of the disclosure and are not intended to limit the scope of the disclosure. For the purposes of the present description, the term "approximately" determines a range of ±10%; thus, if a value of "approximately 30%" is specified, the value is within a range of 27% to 33%. It should also be understood that the specific processes illustrated in the accompanying drawings, and described in the following description, are simply exemplary embodiments of the inventive concepts defined in the attached claims. Therefore, the specific dimensions and other physical characteristics related to the embodiments described herein should not be considered as limiting, unless the claims expressly state otherwise.

The raw material to be used in the process of preparing edible fungi or mushrooms in sauce of the present invention is kept at a temperature of 2° C. to 8° C. An example of said raw material includes the fungi or mushrooms, green tomatoes, onion, chili peppers, tomato, etc.

The raw material to be used in the process of preparing edible fungi or mushrooms in sauce of the present invention is also selected from various spices, seasonings, nightshades, vegetables, etc.

In a first embodiment, the raw material comprises different varieties of chili peppers (*capsicum* spp), including jalapeno chili, dried morita chili, arbol chili, dried pasilla chili, ancho chili, guajillo chili, mirasol chili, colorado chili, puya and costeño chili. Other varieties that are also included within the scope of the present invention are serrano chili, bell pepper, poblano chili, chilaca, Anaheim, soledad chili, piquín chili, habanero chili, manzano chili, etc.

Among the seasonings, spices and vegetables that can be incorporated as raw material in the process of the present invention are, for example, tomato, green tomato, tomatillo, onion, cilantro, garlic (preferably in powder), salt (for example, refined or coarse salt), citric acid, sugar (for example, refined sugar, brown sugar), pepper, cloves, allspice, cinnamon, anise, cumin, coriander, and cinnamon. In one embodiment of the invention these ingredients are used in powder form.

In one embodiment of the invention, edible vegetable oil is used as a raw material in the process of the invention. The edible vegetable oil is selected, for example, from soybean oil, safflower oil, sunflower oil, corn oil, palm oil, coconut oil, canola oil, peanut oil, sesame oil, linseed oil, grapeseed oil, olive oil and mixtures of these, preferably a mixture of soybean oil and canola is used.

The edible fungus or mushroom that is used in the process of the present invention is selected, for example, from among button mushroom, portobello, Caesar's mushroom, bronze bolete, penny bun, chanterelle, trumpet chanterelle, *Hygrophorus latitabundus, Lactarius deliciosus*, king trumpet mushroom, oyster mushroom, charcoal burner, black truffle and straw mushroom; preferably button mushroom is used.

In one embodiment of the invention, the mushroom is sliced into slices with a thickness of approximately 6 to approximately 8 mm, preferably into slices with a thickness of approximately 7 mm.

Advantageously, the sauce and process of the present invention do not use artificial preservatives to preserve the properties of the sauce.

Once the crude raw material will be used, it is subjected to a treatment prior to its use in the process of the invention, that is, the ingredients are selected by hand to discard any defective crude raw material and eliminate any foreign matter. For example, pretreatment for chili peppers involves sorting, removing stems, weighing, and washing. In the case of green tomatoes or tomatillos, removing the husks, weighing and washing. For the onions, any damaged or bruised layers are also detached. Tomatoes are also weighed and washed. For the cilantro, any wilted leaves are removed, and it is weighed and washed.

The selected crude raw material is washed by immersion or in a washing machine, preferably a cylinder rotary machine with a rotation speed of approximately 19 to approximately 25 RPM, preferably approximately 22 RPM, with a fungicidal disinfectant from approximately 540 to approximately 1080 ppm for approximately 30 minutes.

The washed raw material is blanched (10) in a container with water at a temperature of approximately 75° C. to approximately 92° C., preferably approximately 84° C., for approximately 18 to 22 minutes, preferably 20 minutes. In a first embodiment, the nightshades and the vegetables that will be present in the sauce—for example, green tomatoes, onion, cilantro, one or more of the aforementioned chili peppers, for example, dried morita chili, arbol chili and/or pasilla chili—are blanched.

Once the blanching times have elapsed, the excess water (15) is removed from said raw material and it is placed in a container to be sent to milling.

The raw material is milled (20) together with the seasonings and spices, in a container at a rotation speed of approximately 3100 to 3700 RPM in order to obtain a homogenate with a particle size of approximately 1 to 6 mm, the preferred rotation speed for milling the raw material is approximately 3400 RPM while the preferred particle size is approximately 3 mm, thus obtaining a homogenate.

The edible vegetable oil is poured (30) into a pressure vessel heated by steam at approximately 1 to 2 kg/cm$^2$ and the temperature of the vegetable oil is raised in a range from approximately 100° C. to approximately 120° C., preferably approximately 110° C., during approximately 3 to 5 minutes.

The homogenate (20) is added (40) to the container with heated edible vegetable oil, causing a decrease in the temperature of the edible vegetable oil and said homogenate/oil mixture is stirred by means of a variable stirring system with a stirring speed of approximately 18 to 23 RPM for approximately 5 to 10 minutes.

The homogenate/oil mixture is kept at a stirring speed until reaching a temperature of approximately 71° C. to 86° C., preferably approximately 84° C., the powdered ingredients are added (50) forming a homogenate/oil/powdered ingredients mixture. In an illustrative embodiment of the invention, the powdered ingredients comprise garlic powder, salt (refined or coarse), and citric acid; in a second embodiment, the powdered ingredients comprise garlic powder, refined salt, citric acid, and refined sugar.

The prior processing (65) of the edible fungus or mushroom comprises manual selection, washing using the previously described technique, blanching with the aforementioned parameters, cooling and slicing.

Once the homogenate/oil/powdered ingredients mixture reaches a temperature of approximately 70° C. to 97° C., preferably approximately 80° C., the sliced edible fungus or mushroom, previously processed, is added (60) to said homogenate/oil/powdered ingredients mixture, maintaining the stirring speed of approximately 18 to 23 RPM, preferably approximately 19 to 21 RPM, until the homogenate/oil/powdered ingredients/fungus or mushroom mixture boils at a temperature of approximately 90° C. to approximately 93° C. Once the aforementioned boiling temperature has been reached, the steam supply (70) to the steam-heated pressure vessel is shut off.

Advantageously, when adding the fungi or mushrooms in this part of the process, the sliced fungus or mushroom present in the sauce acquires a uniform firm texture in all the mushroom slices unlike what happens in the prior art, where the mushrooms are added for cooking in early stages of the process, causing the mushroom to lose water during cooking and meaning that the mushroom is not able to absorb the sauce in which it is immersed, additionally, in the present invention it is visually verified that the slices remain whole and that they do not break.

In accordance with the present invention, since the mushroom slices are added in said step of the present process, the amount of water lost during the cooking of the mushroom is replaced by the sauce in which said slices are immersed, this is verified by visual inspection of the slices where it is observed that the size of the slice does not decrease. Additionally, the hardness of the cooked mushroom slices of the present invention is approximately 32.34±0.43N A sample of the end product is taken to verify that physicochemical parameters such as salt %, acidity % and pH comply with established parameters. Once it has been verified that the end product complies with the parameters established as described hereunder, it is released and sent to the filling process. For reference, the salt % is in a range from approximately 1.1 to 2.0, preferably from approximately 1.3 to approximately 1.7; the acidity % is in a range from approximately 0.4 to approximately 1.0, preferably from approximately 0.6 to approximately 0.7; the pH is preferably from 3.8 to approximately 4.1.

The end product is sent to the filling area via a positive displacement pump to prevent the fungus or mushroom slices from deteriorating through stainless-steel tubing to a tank of a filling machine that reaches a temperature of approximately 25 to 65° C. to be packaged.

Additionally, the end product is packaged in containers that can be sterilized in an autoclave, said packaging is carried out automatically in known machines of the prior art using two sealing jaw stations, the first one making a preliminary seal at a temperature of approximately 145° C. and the second station at a temperature of approximately 175° C. for an exposure time of approximately 1 second in each station to ensure the tightness of the seal.

Once the container is filled and sealed, it is passed through an inkjet coder to place the coding that consists of placing the letter "1" of the batch ("lote" in Spanish), company identification letter, Julian day, time, product identification, expiry date.

The thermal process of the bags is carried out to comply with a temperature of approximately 110° C. for approximately 6 minutes, taking into consideration that this process was developed with heat penetration studies and thermal process calculations that take into account that the product pH is in a range from approximately 3.8 to 4.1. The thermal process of the bags inside the autoclave includes the temperature rise time, the holding time at the process temperature and the cooling time to the temperature of approximately 40° C., the entire control and thermal process is done automatically in an autoclave.

Example

Preparation of Mushrooms in Green Sauce

Green tomatoes and jalapeno peppers previously selected and washed are blanched together with onion in water at a temperature of 75 to 92° C. for 15 to 30 minutes; after this time the blanched ingredients and seasonings and spices are milled in an Urschel processor with a 6-mm opening head with a rotation speed of 3100 to 3700 revolutions per minute to obtain a particle size of the ingredients of 1 to 6 mm maximum; additionally, vegetable oil is added to a type 316 stainless-steel tank with a jacket for heating by steam at a pressure of 1 to 2 $kg/cm^2$ with a variable-speed stirring system that can be from 18 to 23 revolutions per minute, the oil is heated to a temperature of 100 to 120° C. for 3 to 5 minutes, then the homogenate is incorporated and stirred at 18 to 23 RPM for 5 to 10 minutes, when said homogenate is added to the oil, the temperature drops; subsequently, stirring is continued for an additional 3 to 5 minutes until the mixture reaches a temperature of approximately 70 to 97° C. and garlic powder and refined salt (powdered ingredients) are added, when adding the garlic and salt the temperature drops to a temperature of to 86° C. to obtain a homogenate/oil/powdered ingredients mixture; Once the homogenate/oil/powdered ingredients mixture reaches a temperature of between 70 and 97° C., sliced mushrooms are added to the preparation tank, and stirring is maintained at a speed of 18 to 23 RPM, when incorporating the sliced mushrooms to the mixture, the temperature drops to a temperature of 90 to 93° C.; once this temperature is reached, the steam is shut off; a sample is taken and physicochemical parameters are determined, such as salt % within the range from 1.1 to 2.2%, the acidity % is in a range from 0.8 to 1.0%; the pH is in a range from 3.8 to 4.1 to determine that it can be released and sent to the filling process.

The released product is sent to the filling area via a positive displacement pump to prevent the mushroom slices from deteriorating through 316 stainless-steel tubing to the tank of the filling machine which reaches a temperature of 25 to 65° C. to be packaged.

The process for preparing mushrooms in morita chili or pasilla chili sauce is similar, only the type of chili pepper to be used varies.

The invention has been described in an illustrative manner and it should be understood that the terminology, which has been used herein, is intended to correspond to the nature of the words of the description rather than to provide a limitation.

As will be apparent for a person skilled in the art, many modifications and variations of the present invention are possible in light of the above teachings. Therefore, it should be understood that within the scope of the invention described, the invention may be practiced otherwise than specifically described.

The invention claimed is:

1. A process for preparing edible fungi or mushrooms in sauce that comprises:
   a) blanching a raw material in a first container with water;
   b) milling, seasoning and spicing the blanched raw material in a container at a rotation speed of approximately 3100 to 3700 RPM to obtain a homogenate with a particle size of 1 to 6 mm;
   c) pouring edible vegetable oil into a steam-heated pressure vessel at a vessel pressure between 1 to 2 $kg/cm^2$ and raising the temperature of the edible vegetable oil in a range from approximately 100 to 120° C. for 3 to 5 minutes;
   d) adding the homogenate to the steam-heated pressure vessel containing the heated edible vegetable oil to obtain a homogenate/oil mixture and stirring the homogenate/oil mixture at a speed of 18 to 23 RPM;
   e) once the homogenate/oil mixture has reached a temperature of approximately 70 to 97° C., adding powdered ingredients maintaining the stirring speed of step d) until reaching a temperature of 71 to 86° C. in order to obtain a homogenate/oil/powdered ingredients mixture;
   f) once the homogenate/oil/powdered ingredients mixture reaches a temperature of 70 to 97 °C, adding sliced edible fungus or mushroom to said mixture, maintaining the stirring speed of approximately 18 to 23 RPM until the mixture boils at a temperature of 90 to 93° C.;
   g) once said boiling temperature has been reached, shutting off the steam supply to the steam-heated pressure vessel.

2. The preparation process according to claim 1, wherein prior to milling the raw material in step b), excess water is removed from the raw material.

3. The preparation process according to claim 1, wherein prior to adding the sliced edible fungus or mushroom to the homogenate/oil/powdered ingredients mixture from step f), the edible fungus or mushroom is processed by washing, selecting, blanching, cooling and slicing.

4. The preparation process according to claim 3, wherein the edible mushroom is selected from among button mushroom, portobello, Caesar's mushroom, bronze bolete, penny bun, chanterelle, trumpet chanterelle, *Hygrophorus latitabundus, Lactarius* deliciosus, king trumpet mushroom, oyster mushroom, charcoal burner, black truffle and straw mushroom.

5. The preparation process according to claim 3, wherein the edible fungus or mushroom is sliced into slices with a thickness of 6 to 8 mm.

6. The preparation process according to claim 5, wherein the edible mushroom is sliced into slices with a thickness of 7 mm.

7. The preparation process according to claim 1, wherein the powdered ingredients added in step e) comprise garlic powder and refined salt, wherein the powdered ingredients are in a range of 1.5 to 1.6% by weight.

8. The preparation process according to claim 7, wherein the powdered ingredients added in step e) additionally comprise at least one of citric acid and refined sugar.

9. The preparation process according to claim 1, wherein the edible vegetable oil is selected from soybean oil, safflower oil, sunflower oil, corn oil, palm oil, coconut oil, canola oil, peanut oil, sesame oil, linseed oil, grapeseed oil, olive oil and a mixture thereof, wherein the edible vegetable oil is in a range of 1.0 to 1.17% by weight.

10. The preparation process according to claim 1, wherein the raw material comprises green tomatoes, white onion, jalapeño pepper, cilantro, dried morita chili, arbol chili and dried pasilla chili.

11. The preparation process according to claim 10, wherein the dried morita chili, arbol chili and dried pasilla chili are pretreated prior to step a).

12. The preparation process according to claim 11, wherein the pretreatment of the dried morita chili and arbol chili comprises selecting, weighing and washing said dried morita chili and arbol chili.

13. The preparation process according to claim 11, wherein the pretreatment of the dried pasilla chili comprises selecting, removing stems, weighing and washing said dried pasilla chili.

14. The preparation process according to claim 1, wherein the temperature of the blanching water in step a) is from 75 to 92° C. and the raw material remains in said water for approximately 18 to 22 minutes.

15. The preparation process according to claim 1, wherein, in step b), the rotation speed for milling the raw material is 3400 RPM;
in step c), the vessel pressure is 1.387 kg/cm$^2$ and the temperature of the vegetable oil is from 100 to 105° C.; and
in step d), the homogenate/oil mixture is stirred approximately 5 to 10 minutes.

16. The preparation process according to claim 1, wherein in step e) the homogenate/oil mixture reaches a temperature of 70 to 75° C. and the powdered ingredients are added at a temperature of 77 to 80° C.

17. The preparation process according to claim 16, wherein in step f) the sliced edible mushroom is added to the homogenate/oil/powdered ingredients mixture at a temperature of 80° C., and the stirring speed is in a range from approximately 19 to 21 RPM.

* * * * *